2,846,478
Patented Aug. 5, 1958

2,846,478

HALOGEN NUCLEAR SUBSTITUTED DIARYL PARAFFINS

Edwin Marvin Smolin, Stamford, and Kenneth Worden Saunders, Darien, Conn., and Donald R. May, Niagara Falls, Ontario, Canada, assignors to American Cyanamid Company, New York, N. Y., a corporation of Maine No Drawing. Application September 17, 1954
Serial No. 456,866

6 Claims. (Cl. 260—649)

This invention relates to a method for the production of nuclear halogenated substituted diaryl paraffins. More particularly this invention relates to a method of production of nuclear halogenated substituted 1,1-diarylethanes.

The production of diaryl paraffins has been accomplished previously by various methods. For example, hydrocarbons such as toluene and xylene have been reacted with acetylene to produce the corresponding diaryl paraffins. However, as practised in the prior art, low yields were generally obtained. A later process employing certain novel features has been developed whereby increased yields of the diaryl paraffins may be obtained. This process, however, is unlike the process of the present invention which will be discussed more fully hereinbelow.

Another process for the production of diaryl paraffins is accomplished by reacting an aryl compound, such as toluene, with a saturated aliphatic organic compound having a carbonyl group and at least two carbon atoms, such as acetaldehyde, in the presence of hydrogen fluoride or sulfuric acid as a catalyst. It has also been proposed to use a mixture of hydrogen fluoride and fluosulfonic acid as the catalyst for condensation of an aryl compound with a saturated aliphatic organic compound having a carbonyl group and at least two carbon atoms.

A still further method that has been suggested for the production of diarylethanes comprises condensing an aryl compound with vinyl acetate in the presence of an alkylation catalyst. Alkylation catalysts that have been suggested for use in this process are such as aluminum chloride, concentrated sulfuric acid, etc.

An object of the present invention is to provide a novel method of producing nuclear halogenated substituted diaryl paraffins and more particularly to produce nuclear halogenated substituted 1,1-diarylethanes. A further object of the present invention is to provide a new method of producing said compounds wherein certain novel procedural steps are followed. These and other objects of our invention will be discussed in detail below.

In accordance with the process of our invention, nuclear halogenated substituted 1,1-diarylethanes are obtained by reacting a nuclear halogenated substituted aryl compound of the benzene series having at least one hydrogen atom attached to the benzene nucleus with actylene and preferably in the presence of hydrogen chloride and with aluminum chloride as a catalyst. In certain instances reaction may be carried out without hydrogen chloride being added. The aluminum chloride employed as a catalyst in the present invention is used in slight amounts based on the amount of the nuclear halogenated aromatic present during the reaction. The use of larger amounts of aluminum chloride, as for example 40% by weight, may be employed but this amount is wasteful of the catalyst and obviates any possible beneficial results on yields. It is therefore preferred that from about 0.5 to about 2.5% by weight of the catalyst be employed based on the amount of the nuclear halogenated aromatic present. In certain instances as little as 0.1% by weight of the catalyst may be employed but in such cases the reaction is slow. All of the catalyst may be added to the reaction mixture at one time but the catalyst is most advantageously added in increments during the reaction as additional acetylene is introduced for reaction with the nuclear halogenated aromatic compound since acetylene uptake is then better. The amount of the hydrogen chloride present is not critical. For example, the amount of the hydrogen chloride employed may be equivalent in molar proportions to the amount of the aluminum chloride used. Aternatively the amount of the hydrogen chloride used may be such as to maintain the reaction mixture saturated with the hydrogen chloride during the reaction period.

The amount of the acetylene reacted with the nuclear halogenated aromatic in the formation of the nuclear halogenated substituted 1,1-diarylethanes is within the order of from about 15% to about 45% of the stoichiometric amount of acetylene theoretically required to react with all of the nuclear halogenated aromatic present during the reaction. When the amount of acetylene employed falls within the ranges set forth, increased yields of the reaction product are obtained. We have found that if greater than 45% of the stoichiometric amount of acetylene is introduced into the reaction, decreased yields of the nuclear halogenated substituted diarylethanes are obtained inasmuch as deleterious side reactions will occur.

In order that those skilled in the art may more fully understand the invention concept herein presented, the following examples are given by way of illustration and not limitation unless otherwise noted in the appended claims. All parts are parts by weight.

Example 1

To a well-agitated mixture of 1,125 parts of dry chlorobenzene and 25.8 parts of powdered anhydrous aluminum chloride in a suitable reaction vessel equipped with a water condenser, a thermometer, gas inlets and a stirrer, and maintained at 75° C. were added 37.5 parts by weight of acetylene gas over a period of 192 minutes. A slow stream of dry hydrogen chloride gas was also passed into the reaction mixture. After the reaction was completed, the mixture was cooled and dilute hydrochloric acid was added to hydrolyze the aluminum chloride. The mixture was washed with water and then with aqueous sodium hydroxide solution and distilled. There was obtained 260 parts of 1,1-bis(chlorophenyl) ethane representing a 67.5% yield based on chlorobenzene used up and 59.9% based on acetylene.

Example 2

To 1378 parts of dry chlorobenzene and 18.6 parts of anhydrous aluminum chloride agitated in a suitable reaction vessel maintained at 75° C. was added 53.5 parts of gaseous acetylene of 33.5% of theory. Hydrogen chloride was bubbled in slowly at the same time. The reaction mixture was treated in the same manner as set forth in the above example whereupon 266 parts of 1,1- bis (chlorophenyl) ethane was obtained representing a yield of 75% based on chlorobenzene used up and 52% based on acetylene. The reaction product i. e., 1,1-bis (chlorophenyl) ethane obtained in this and the preceding example had a boiling point at 204° C. at 22 millimeters mercury; a density at 25° C. of 1.210 and $N_D^{25}=1.5889$.

Example 3

In the same equipment as previously employed was placed 1820 parts of ortho-dichlorobenzene and 45.4 parts of anhydrous aluminum chloride. To the agitated mixture maintained at 75° C. was added 68.6 parts of acetylene or 28.3% of theory. Upon treatment similar to that described in the preceding examples, there was obtained 472 parts of 1,1-bis (dichlorophenyl) ethane which represents a yield of 72% based on ortho-dichlorobenzene used up and 55.5% yield based on acetylene. The product had a boiling point of 225° C. at 12 millimeters mercury; $N_D^{25}=1.6114$ and a density at 25° C. of 1.38 grams per cubic centimeter.

Example 4

The combined products of three runs representing a total charge of 4,690 parts of para-dichlorobenzene and 117 parts of anhydrous aluminum chloride prepared in accordance with the preceding examples was distilled to obtain 577 parts of 1,1-bis (dichlorophenyl) ethane representing a yield of 36% based on para-dichlorobenzene used up and 39% based on acetylene. The amount of acetylene used in this example was 182 parts or 28.3% of theory. The boiling point of the product was 210° C. at 10 millimeters mercury.

Example 5

To a well-agitated mixture of 1790 parts of 1,2,3-trichlorobenzene and 10 parts of anhydrous aluminum chloride maintained at 75° C. were passed in 57.5 parts of acetylene or 45% of theory over a period of 221 minutes. A total of 12 additional parts of aluminum chloride were added during 10-minute intervals throughout the course of the reaction. The reaction mixture was maintained saturated with hydrogen chloride gas. A total of 98% of the input acetylene was absorbed. After washing with dilute hydrochloric acid, water and caustic solution, distillation yielded 454 parts of 1,1-bis (v-trichlorophenyl) ethane representing a 58% yield based on 1,2,3-trichlorobenzene used up and a 45% yield based on acetylene. The chloro-substituted diarylethane distilled at 186–189° C. at 0.15 millimeters mercury pressure. It may be recrystallized from ethanol whereupon colorless prisms melting at 142–143° C. are obtained.

Example 6

To the equipment previously employed were charged 1,452 parts of 1,2,4-trichlorobenzene and 61 parts of anhydrous aluminum chloride. To the well-stirred mixture maintained at 75° C. were added 41.6 parts of acetylene gas over a period of 170 minutes while maintaining the reaction mixture saturated with dry hydrogen chloride gas. After hydrolysis, washing and neutralization, the reaction product was distilled yielding a total of 243 parts of 1,1-bis (as-trichlorophenyl) ethane which represents a yield of 55.6% based on 1,2,4-trichlorobenzene used up and 34.4% based on acetylene. The chloro-substituted diarylethane was a heavy viscous oil distilling at 199–204° C. at 0.2 millimeters mercury pressure, part of which could be crystallized from acetone yielding colorless prisms melting at 133–135° C.

Example 7

Employing the same equipment as previously used 1265 parts of chlorotoluene and 52 parts of anhydrous aluminum chloride were treated at 50° C. with 52 parts of gaseous acetylene keeping the solution saturated by bubbling in a slow stream of hydrogen chloride gas. Three additional parts of aluminum chloride were added every 5 minutes for the duration of the run which was 144 minutes. After working up the product, there was obtained 150 parts of 1,1-bis (methylchlorophenyl) ethane distilling at 154° C. at 2 millimeters mercury pressure which represents a yield of 50.4% based on chlorotoluene used up and 27% based on acetylene input.

Reaction of the acetylene with the nuclear halogenated substituted aryl compound to produce the nuclear halogenated substituted 1,1-diarylethanes in accordance with our invention may be carried out at temperatures from as low as 0° C. up to the boiling point of the particular nuclear halogenated aromatic employed. However, it is preferred that the reaction temperature be maintained within the order of from about 40° C. to about 120° C. It will be obvious in certain instances that the lower temperature that may be employed will be governed by the melting point of the particular nuclear halogenated aromatic being reacted.

Nuclear halogenated aromatic compounds that may be employed in accordance with the process of our invention for the production of nuclear halogenated substituted 1,1-diarylethanes, other than those disclosed in the preceding examples, include nuclear halogenated substituted aryl compounds of the benzene series having at least one hydrogen atom attached to the benzene nucleus. The benzene nucleus may be substituted by any of the halogens, e. g., fluorine, chlorine, bromine, and iodine. Also, the benzene nucleus may be mono-, di- or a trisubstituted compound. The nuclear halogenated substituted aryl compound may also contain mono- and dialkyl substituted constituents. Examples of suitable compounds that may be employed are such as monochlorobenzene, monofluorobenzene, dichlorobenzene, diiodobenzene, trichlorobenzene, tribromobenzene, chlorotoluene, bromotoluene, iodoxylene, ethylchlorobenzene and the like.

The nuclear halogenated substituted diarylethanes herein produced are particularly useful as insecticides or as starting materials in the production of insecticides. Also the nuclear mono and dihalogenated substituted diarylethanes may be cracked in accordance with processes well known in the art for the production of nuclear halogenated substituted styrene compounds. Such nuclear halogenated substituted styrenes are useful in the production of synthetic resins and in view of the halogen substituent give enhanced fire-resistant properties.

We claim:

1. A process for preparing a nuclear halogenated substituted 1,1-diarylethane which comprises reacting a nuclear halogenated substituted aryl compound of the benzene series having at least one hydrogen atom attached to the benzene nucleus with acetylene wherein the acetylene is present in an amount between 15% and 45% of the stoichiometric quantity required to react with said aryl compound and in the presence of hydrogen chloride and an aluminum chloride catalyst.

2. A process for preparing a nuclear chlorinated substituted 1,1-diarylethane which comprises reacting a nuclear chlorinated substituted aryl compound of the benzene series having at least one hydrogen atom attached to the benzene nucleus with acetylene wherein the acetylene is present in an amount between 15% and 45% of the stoichiometric quantity required to react with said aryl compound and in the presence of hydrogen chloride and an aluminum chloride catalyst.

3. A process for preparing 1,1-bis(chlorophenyl)ethane which comprises reacting chlorobenzene with acetylene wherein the acetylene is present in an amount between 15% and 45% of the stoichiometric quantity required to react with said chlorobenzene and in the presence of hydrogen chloride and an aluminum chloride catalyst.

4. A process for preparing 1,1-bis(dichlorophenyl)-ethane which comprises reacting o-dichlorobenzene with acetylene wherein the acetylene is present in an amount between 15% and 45% of the stoichiometric quantity required to react with said o-dichlorobenzene and in the presence of hydrogen chloride and an aluminum chloride catalyst.

5. A process for preparing 1,1-bis(v-trichlorophenyl) ethane which comprises reacting 1,2,3-trichlorobenzene with acetylene wherein the acetylene is present in an amount between 15% and 45% of the stoichiometric quantity required to react with said 1,2,3-trichlorobenzene and in the presence of hydrogen chloride and an aluminum chloride catalyst.

6. A process for preparing 1,1-bis(methylchlorophenyl) ethane which comprises reacting chlorotoluene with acetylene wherein the acetylene is present in an amount between 15% and 45% of the stoichiometric quantity required to react with said chlorotoluene and in the presence of hydrogen chloride and an aluminum chloride catalyst.

References Cited in the file of this patent

Thomas: "Anhydrous Aluminum Chloride in Organic Chemistry," pages 497–9 (1941).

Cook et al.: "Jour. Am. Chem. Soc.," vol. 43, pp. 334–40 (1921).